Patented Feb. 16, 1926.

1,573,369

UNITED STATES PATENT OFFICE.

RAYMOND C. BENNER, OF BAYSIDE, NEW YORK, ASSIGNOR TO THE PREST-O-LITE COMPANY, INC., OF NEW YORK, N. Y., A CORPORATION OF NEW YORK.

STORAGE-BATTERY SEPARATOR.

No Drawing.   Application filed January 21, 1922.   Serial No. 530,943.

*To all whom it may concern:*

Be it known that I, RAYMOND C. BENNER, a citizen of the United States, residing at Bayside, Long Island, in the county of Queens and State of New York, have invented certain new and useful Improvements in Storage-Battery Separators, of which the following is a specification.

This invention is an improved storage battery separator.

It has been proposed to form a separator by felting together soft wood fibre to form a thin sheet which is preferably impregnated at its margin only in order to give it greater strength and resistance to disintegration. The impregnation is confined to the margin of the plate because an impervious material such as paraffin, if used for this purpose, destroys the permeability of the separator wherever it is applied. Separators prepared in this way are subject to the defect that the inner effective portion which is not impregnated is lacking in mechanical strength and soon disintegrates in the battery.

It has also been proposed to make a separator of cellulosic fibre agglomerated with pyroxylin to impart stiffness and durability. Separators made in this way are expensive and are lacking in permeability due to the presence of pyroxylin in them.

It has likewise been proposed to impregnate ordinary wood separators with a solution of a soluble silicate and then to decompose the silicate by treatment with an acid in order to deposit gelatinous silicic acid in the pores of the wood. The wood separators subjected to this treatment must be of the same quality as the unimpregnated separators commonly used, that is to say, they must be free from all defects which would permit battery sediment to pass through them.

According to the present invention, all the advantages of the wood separator impregnated with gelatinous silicic acid are combined with certain other advantages not possessed by this type of separator. In making separators in accordance with my invention, cellulosic fibre of suitable strength and free from substances capable of exerting an injurious action on the storage battery are felted together to form a more or less compact board of suitable thickness, for example about the thickness of the wood separator plates now used in many storage batteries. A board so fabricated, after complete drying or after withdrawing only the water which is readily removable, is impregnated with a soluble silicate, as for example by immersing it in a water-glass solution of about 1.20 specific gravity. When the soluble silicate has sufficiently penetrated the fibre structure, it may be removed and dried for subsequent use or it may be immediately installed in a battery while still wet with the solution. In case the latter procedure is followed, the soluble silicate is immediately decomposed by the electrolyte acid, and gelatinous silicic acid is deposited throughout the pores of the fibre board. This gelatinous silicic acid renders the plate absolutely impervious to battery sediment without materially diminishing its permeability to the electrolyte, and at the same time serves to protect the fibre from the action of the electrolyte acid which tends to injure the fibre, especially after long periods of use and when the battery becomes considerably heated during charging.

The board impregnated with the soluble silicate, whether in dry or moist form, may be subjected to suitable treatment outside the battery to decompose the soluble silicate and liberate the silicic acid. By this method of operation all contamination of the electrolyte of the battery in which the separator is eventually to be used is avoided, as the soluble salts formed by the decomposition of the soluble silicate may be washed out of the separator plate before installing it in the battery. Even when the decomposition of the silicate is effected outside the storage battery, sulfuric acid of about electrolyte strength is the preferred decomposing agent, although other liquid or gaseous reagents which decompose soluble silicates in a similar way are included in my invention.

A suitable form of cellulosic fibre for use in the manner described above, is sulfite wood fibre of good quality, this being sufficiently free from deleterious substances for storage battery use.

As compared with the method referred to above wherein a wood sheet is impregnated with a soluble silicate which is then decomposed, the present invention has the advantage that the cellulosic fibre employed may be made from materials which are not of sufficiently high quality to adapt them for the manufacture of separator plates. The cost of production is therefore somewhat cheapened. In addition, my invention gives rise to the advantages that the separator produced from sulfite fibre or the like is less liable to breakage than a wood separator plate, although the sulfite board is sufficiently flexible for the purpose. The sulfite board is also of more uniform quality and more uniform with respect to the distribution of pores, so that a correspondingly better distribution of the gelatinous silicic acid is obtained.

The cellulosic fibre board may be prepared in the form of a sheet having plane surfaces or it may be corrugated in any desired manner in order that acid wells and channels may be provided between the active plates.

While I have described my invention in connection with a particular form of fibre and in connection with a soluble silicate as a substance adapted to give a gelatinous decomposition residue within the pores of the separator, it will be understood that variations in the character of the fibre are within my invention and that soluble silicate may be replaced by other materials which can be introduced in the separator plate in soluble form, and which can be decomposed within the plate to produce a gelatinous residue adapted to obstruct the pores to a sufficient extent and to protect the fibre from the action of the electrolyte.

I claim:

1. A storage battery separator comprising a fabricated sheet of sulfite wood fibre impregnated with a substance capable of reacting with a strong mineral acid to form a gelatinous, acid-proof, decomposition residue permeable to electrolyte.

2. A storage battery separator comprising a fabricated sheet of sulfite wood fibre impregnated with a soluble silicate.

3. A storage battery separator comprising a fabricated sheet of sulfite wood fibre impregnated with gelatinous silicic acid.

In testimony whereof, I affix my signature.

RAYMOND C. BENNER.